United States Patent [19]

Siol et al.

[11] Patent Number: 4,892,909
[45] Date of Patent: Jan. 9, 1990

[54] COMPATIBLE STYRENE-METHACRYLATE POLYMER BLENDS

[75] Inventors: Werner Siol, Darmstadt-Eberstadt; Ulrich Terbrack, Reinheim, both of Fed. Rep. of Germany

[73] Assignee: Roehm GmbH Chemische Fabrik, Darmstadt, Fed. Rep. of Germany

[21] Appl. No.: 233,754

[22] Filed: Aug. 19, 1988

[30] Foreign Application Priority Data

Sep. 8, 1987 [DE] Fed. Rep. of Germany ....... 3730026

[51] Int. Cl.$^4$ ................ C08L 25/04; C08L 25/06; C08L 33/10
[52] U.S. Cl. .................. 525/216; 525/227; 525/308; 525/309; 525/931
[58] Field of Search ............... 525/227, 216, 309, 931

[56] References Cited

U.S. PATENT DOCUMENTS

| | | | |
|---|---|---|---|
| 3,055,859 | 9/1962 | Vollmert | 525/227 |
| 3,236,914 | 2/1966 | Murdock et al. | 525/931 |
| 4,064,099 | 12/1977 | Odate et al. | 525/227 |
| 4,722,595 | 2/1988 | Siol | 350/353 |
| 4,772,506 | 9/1988 | Siol et al. | 428/212 |

FOREIGN PATENT DOCUMENTS

| | | |
|---|---|---|
| 204974-A | 12/1986 | European Pat. Off. |
| 230030-A | 7/1987 | European Pat. Off. |
| 3436476.5 | 4/1986 | Fed. Rep. of Germany |
| 3436477.3 | 4/1986 | Fed. Rep. of Germany |
| 3632369 | 3/1988 | Fed. Rep. of Germany |
| 3638443 | 5/1988 | Fed. Rep. of Germany |

Primary Examiner—Carman J. Seccuro
Attorney, Agent, or Firm—Oblon, Spivak, McClelland, Maier & Neustadt

[57] ABSTRACT

A compatible polymer blend consisting of:
(I) 0.1-99.9% by weight of a polymerisate P1, which is formed from monomers of formula I:

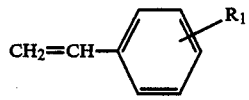

wherein $R_1$ is hydrogen or methyl, and (II) 99.9-0.1% by weight of copolymerisate P2, which is formed from (a) 5-40% by weight of cyclohexyl methacrylate, (b) 30-70% by weight of a methacrylic ester of formula II:

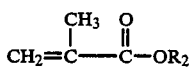

wherein $R_2$ is methyl or ethyl, (c) 10-50% by weight of a methacrylic ester of formula III:

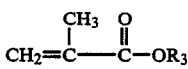

wherein $R_3$ is a hydrocarbon group having 4-18 carbon atoms, and (d) 0-10 parts by weight of a monomer M which is copolymerizable with monomers of (a)-(c), yet different from these monomers.

11 Claims, No Drawings

COMPATIBLE STYRENE-METHACRYLATE POLYMER BLENDS

BACKGROUND OF THE INVENTION

1. Field of the Invention

The invention relates to compatible polymer blends composed of at least two different types of polymer components, whereby the one polymer component Pl is of the poly(methyl)styrene type, while the other polymer component P2 is of methacrylic ester terpolymers.

2. Description of the Background

As a rule, different polymer species are not compatible when mixed or blended, i.e. down to negligible proportions of a component. Different polymer species do not generally form a homogenous phase, which could be characterized by complete miscibility of the components. Certain exceptions to this rule have led to growing interest of those skilled in the art to such homogenous polymer blends, in particular to, theoretical explanations of the phenomena.

Totally compatible polymer blends exhibit complete solubility (miscibility) in all blending ratios. In order to prove miscibility, the glass temperature Tg or the so-called "optical method" (clarity of a film cast from a homogenous solution of a polymer mixture) has been frequently observed. (Cf. Brandrup-Immergut, Polymer Handbook, 2nd ed., III-211-213; Kirk-Othmer, Encyclopedia of Chemical Technology, 3rd ed., Vol. 1B, pp. 443-478, J. Wiley & Sons 1982).

The polymers - polystyrene and polymethyl methacrylate (PMMA) - are examples of almost complete incompatibility. (cf. 0. Olabisi, L.M. Robeson, M.T. Shaw, Polymer-Polymer Miscibility, Academic Press, 1979, pg. 4 ff.) However, polystyrene, poly-m-methylstyrene and poly-p-methylstyrene are quite compatible with polycyclohexyl(meth)acrylate (cf. unpublished German Patent Application Nos. P 36 32 369.1 and P 36 38 443.7). Interestingly, no compatibility has been determined for such polystyrenes with polymers composed of other, aliphatic methacrylic esters.

However, compatibility still exists even if the cyclohexyl methacrylate is copolymerized to a certain extent with methyl methacrylate. This finding is interesting primarily from the point of view of commercial application since pure polycyclohexyl methacrylate is extremely brittle. A need therefore continues to exist for improved blends of polystyrene materials with polycyclohexylmethacrylate.

SUMMARY OF THE INVENTION

Accordingly, one object of the present invention is to provide a homogenous polystyrenepolycyclohexylmethacrylate blend of improved properties, in particular reduced brittleness.

Briefly, this object and other objects of the present invention as hereinafter will become more readily apparent can be attained by a compatible polymer blend comprising (I) 0.1–99.9% by weight, preferably 5–95% by weight and especially preferably 20–80% by weight of a polymerisate Pl which is formed of monomers of formula I:

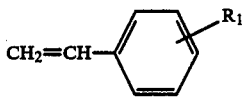

wherein $R_1$ denotes hydrogen or methyl, and (II) 99.9–0.1% by weight, preferably 95–5% by weight and especially preferably 80–20% by weight of a copolymer P2, which is formed of (a) 5–40% by weight, preferably 10 to 30% by weight of cyclohexyl methacrylate, (b) 30–70% by weight, preferably 30 to 60% by weight of a monomer of the formula II.

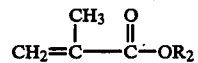

wherein $R_2$ denotes methyl or ethyl, (c) 10–50% by weight, preferably 10 to 40% by weight of a monomer of the formula III:

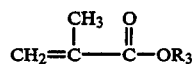

wherein $R_3$ denotes an alkyl group having 4–18 carbon atoms, and (d) to 0–10% by weight of another monomer M that is copolymerizable with the monomers of (a)–(c) yet different from them, whereby the sum of the monomers of (a)–(d) is 100% by weight.

DETAILED DESCRIPTION OF THE PREFERRED EMBODIMENTS

The properties of compatible blends composed of polymers of styrene or its derivatives, on the one hand, and polycyclohexyl methacrylate on the other hand are not satisfactory in every respect because of the embrittling effect of the latter component. It has now been found that, surprisingly, the proportion of the embrittling component cyclohexyl methacrylate can be significantly reduced, if as comonomer, methyl methacrylate is not used alone but rather a mixture of methyl methacrylate and/or ethyl methacrylate, on the one hand, and a longer chained alkyl methacrylate, in particular an alkyl methacrylate having 4–18 carbon atoms in the alkyl group, on the other hand, is used.

Of special interest are polymer blends in which $R_2$ denotes methyl. Still others are those in which in formula III, $R_3$ denotes a linear alkyl group having 4 to 18 carbon atoms or a cycloalkyl group, if desired substituted, having 4–12 carbons in the ring except for cyclohexyl.

With the same cyclohexyl(meth)acrylate content, the polymer blends PM of the invention are clearly more compatible than binary copolymerisates, which are prepared from only methyl methacrylate and cyclohexyl methacrylate. Under otherwise the same boundary conditions, the polymer blends PM have a distinctly higher LCST, generally by 50°–150° C., in comparison to blends with binary copolymerisates.

Criteria for Compatibility

According to the definition, the polymer blends PM of the present invention are compatible blends. In the sense of the present invention and in agreement with the customary concepts and definition in the practice of polymer chemistry, compatible blends are understood to be stable, homogeneous blends, which macroscopically have the properties of a one phase material. (cf. Kirk-Othmer, Vol. 18, loc. cit., pp. 446, 457-60; Brandrup & Immergut, "Polymer Handbook," loc.cit. III-211).

As criteria for compatibility, the following-in agreement with the standard texts-are relevant factors:

(I) The glass transition temperature Tg.

To the extent that polymer components have glass transition temperatures with sufficiently wide ranges that they can be differentiated dilatometrically, dielectrically, or radioluminescence spectroscopically by means of differential scanning calorimetry (DSC), the compatibility shows its presence by a shift of the Tg's of the polymer single components. (cf. Olabisi et al. in Polymer-Polymer Miscibility, loc.cit., pp. 21, 123). In general, the glass temperature of the polymer blends PM of the present invention is <120° C., in particular <100° C.

(II) The "optical method"

In this method a film, which after drying, even if enlarged, may not have an optically perceivable nonhomogeneity, is cast from a homogenous solution of the polymer components.

(III) Another test for the miscibility of different polymers is the occurrence of the lower critical solution temperature (LCST). (Cf. DE-A 34 36 476.5 and DE-A 34 36 477.3).

The occurrence of the LCST is based on the phenomenon that upon heating the polymer blend, which up until then has been clear and homogenous, separates into phases and optically turns cloudy to opaque. According to the literature, this characteristic is definite proof that the original polymer blend had consisted of a single homogenous phase in equilibrium.

The observed improved compatibility of the polymer blends PM of the present invention is even more remarkable since normally increasing the chain mobility (namely when acrylates are used as comonomers) clearly reduces the polymer compatibility.

The polymerisate P1

The polymerisate P1 is produced in the conventional manner by means of polymerization of the monomers of formula I. (Cf. R. Vieweg, G. Daumiller, Handbook of Plastics, Vol. V, "Polystyrene," C. Hanser-Verlag 1969; Ullmann's Encyclopädie der Techn. Chemie, 4th edition, Vol. 19, pg. 265, Verlag Chemie; HoubenWeyl, 4th edition, Vol. XIV/1 George Thieme 1961, pp. 753-...).

Styrene can be polymerized radically, anionically, cationically or coordinately, preferably, however, radically polymerized. Polymerization can be thermally initiated or preferably by adding radical initiators. For commercial production polymerization normally is done by bulk or suspension procedures. Suitable initiators are the conventional, for example, azo compounds or per compounds, if desired also redox initiators, whereby the quantity of initiator generally ranges from 0.05 to 2% by weight, with respect to the monomers. By selecting the initiator, an adequate speed of polymerization can be assured in the total temperature range. According to past experiences, the quality of polymerisates P1 that is used is not critical for the implementation and the advantageous effects of the present invention. For example, polystyrenes in the molecular weight range of 10,000 to 1,000,000 can be used.

The copolymerisate P2

In general the copolymerisates P2 can be prepared in the conventional manner from the monomers (a), (b) and (c) supra, and, if desired, (d) supra by means of radical or group transfer polymerization. (Cf. H. Rauch-Puntigam, Th. Volker, Acryl- and Methacryl Compounds, Springer Verlag 1967; Houben-Weyl, 4th edition, Vol. XIV/1 loc.cit., pp. 1010 ff.) Polymerization can occur in bulk, in suspension, or in solution. In the case of radical polymerisates, preferably the conventional radical initiators, for example, peroxides, in particular organic peroxide compounds such as dibenzoyl peroxide or dilauroyl peroxide; azo compounds such as azodiisobutyronitrile; or, if desired, redox initiators, can be used in quantities of usually approx. 0.01 to 2% by weight (with respect to the monomers) (Cf. Rauch-Puntigam, loc.cit., D.W. Wood, R.N. Lewis, Plastics Engineering, May 1975, pp. 51-53). However, the starting radicals can also be produced by high energy radiation. The conventional sulfur controllers, in particular mercapto compounds, can be used, for example, as controllers. According to the present observations, the molecular weight of the polymerisates P2 has no clear limiting influence on compatibility. However, the previously stated rule also applies here that as the molecular weight of the polymers increases, the compatibility with foreign polymers tends to decline.

In general the copolymerisates have a molecular weight Mw determined by the light scattering method, ranging from 5,000 to 1,000,000, preferably from 10,000 to 200,000. The non-uniformity generally ranges from 0.1 to 10.

Monomers (c) especially include the linear alkyl esters, in particular, n-butyl methacrylate, hexyl methacrylate, octyl methacrylate, and n-decyl methacrylate as well as lauryl-, tetradecyl-, hexadecyl and octadecyl methacrylate. In addition to this, monomers (c) include, if desired, substituted cycloalkyl esters, but not cyclohexyl methacrylate, having 5-15 carbon atoms.

Comonomers M, which, if desired, can be present preferably in quantities of 1 to 10 parts by weight, preferably 2 to 5 parts by weight, include, for example, monomers of formula IV:

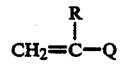

IV wherein R denotes hydrogen or methyl and Q denotes a —COOR4 group, wherein R4 is hydrogen or a cation M, in particular an alkali metal cation such as sodium or potassium or an ammonium cation or one having a hydroxy group or a —NR5R6 group, wherein R5 and R6 denote, independently of each other, an alkyl group having 1 to 6 carbon atoms or by the groups together with the nitrogen atom forming a 5 or 6 membered ring, preferably terminally substituted alkyl group having 1 to 6 carbon atoms, or when R is hydrogen, R4 stands for an alkyl group having 1 to 24 carbon atoms, preferably 1 to 8 carbon atoms, or wherein Q denotes an

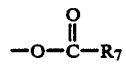

group, wherein $R_7$ stands for an alkyl group having 1 to 3 carbon atoms or Q denotes a phenyl group. Included are, for example, (meth)acrylic acid or its salts, as well as the hydroxyalkyl esters of (meth)acrylic acid and aminoalkyl esters of (meth)acrylic acid.

Production of polymer blends PM

The compatible blends PM can be produced by various methods. For example, they can be produced by intensive mechanical blending of the P1 and P2 components as a melt, in an extruder, or the like, or they can be produced from a common solvent as a socalled "solution cast polyblends." (Cf. Kirk-Othmer "Encyclopedia of Chemical Technology," 3rd ed., Vol. 18, pp. 443-478, J. Wiley, 1982). One can also proceed in such a manner that polymer P1 is dissolved in the monomer mixture of the other polymer P2 and then P2 is produced in the presence of polymer P1. Conversely, polymer P1 can, of course, also be produced in the presence of P2. Similarly the polymer blend PM can be produced from common precipitants. No limits have been set on the type of blend.

As a rule, blends of the components P1 and P2 are produced. It is advantageous to start with solids in the form, for example, of a bead polymerisate or a granule, using slowly blending devices such as drums, Rhon wheels or dual chamber plough mixers. The slowly blending devices induce a mechanical mixing that, as a rule, does not change the phase boundaries. (Cf. Ullmann's Encyclopädie der Technischen Chemie, 4th edition, Vol. 2, pp. 282-311, Verlag Chemie). Then the thermoplastic work-up follows by means of homogenous blending in the melt, using heatable blenders at suitable temperatures, e.g. 150° to approximately 300° C. in kneaders or preferably extruders, e.g. single or multi-screw extruders or, if desired, in extruders with oscillating screw and shear pins (e.g. in BUSSCO kneader).

With this process the same particle size of granules, e.g. hot cast-off, cube-shaped, round particles, can be produced. The particle size of the granules ranges from 2 to 5 mm. Another simple method for producing polymer compounds PM is to mix polymer dispersions, containing polymer component P1, and polymer dispersions, containing the polymer component P2. These dispersion mixtures can be jointly coagulated, jointly spray dryed, or jointly squeezed out on an extruder. On the other hand, the dispersion mixtures can also be jointly dried to a film.

In preparing commercial formulations of polymer blends conventional additives such as softeners, dyes and pigments, fillers, lubricants, and stabilizers can be incorporated in the formulations.

In general the stabilizers, auxiliary agents, softeners, fillers, reinforcing agents, and coloring matters, as listed by R. Gachter and H. Müller in Handbook of Plastic Additives, Hanser Verlag, Munich, Vienna, are suitable additives. In particular, reference is made to Chapter 3: Light-stability Agent for Thermosetting Plastics, pp. 101-198. In particular, those stabilizers listed in Ullmann's Encyclopedia for Engineering Chemistry, 4th edition, Vol. 15, pp. 253-273, Verlag Chemie 1978, are suitable stabilizers. Those dyes that are listed in Ullmann, loc.cit., Vol. 15, pp. 275-279, are, for example, suitable dyes.

In addition to the polymer components P1 and P2, the polymer blend PM can contain other polymer components (P3) that are not compatible with P1 and P2. As a rule, P3 is a rubber such as butadiene or polybutyl acrylate. Generally this rubber is bonded at least partially covalently with at least one of the two polymer components, for example polybutadiene with polystyrene. Blends with P3 additive are also generally two-phase: one phase=compatible polymer blend of P1 and P2, while the second phase=P3.

Advantageous effects of polymer blends PM

The compatible polymer blends PM of the invention have, in particular, the following advantages, which suggest the corresponding technical application possibilities. (The term "polystyrene" denotes a substitute for polymer P1). In general the application of compatible blends PM of the present invention focuses on areas in which polystyrene is used.

(a) A primary advantage is the compatibility of polymer blends PM. This means optical and mechanical preferences with respect to compatible polymer blends.

(b) With respect to polycyclohexyl methacrylate, the copolymers of the invention, however, exhibit significantly less brittleness. Since the compatibility is good especially with blends high in polystyrene, the copolymerisates P2 to be applied according to the invention are especially suitable for application in thin protective layers on polystyrene. In this manner the further processing of waste is also solved to a fair degree.

(c) The result of coating polystyrene with the copolymers P2 is good adhesive protective layers, which modify the solvent resistance of polystyrene in a positive sense. In addition to this, based on the modified refraction index, the optical transmission of articles made of polystyrene, improved by approximately 2%. In general by coating polystyrene with the copolymers P2, especially those which contain antiultraviolet and antiaging agents, the resistance to weather and in general the service life of the articles made of polystyrene are improved.

(d) The technical information on which the present invention is based can be used to produce optically gradient fibers. For example, gradient fibers having the following structure, are possible:
core: polystyrene $nD^{20} = 1.59$
sheath: copolymer P2 $nD^{20} = 1.49$
The transition from core to sheath is continuous.

(e) Based on the distinct LCST characteristic, which currently can be confirmed for all of the investigated PM systems, the polymer blends can be used as optical switches (cf. DE-A 34 36 476).

(f) The copolymers P2 can be substituted for polystyrene as a processing agent. In this case, the co-usage of 1-10 parts by weight of a thermostabilizing comonomer M, in particular of the formula IV, wherein R is hydrogen, is recommended.

(g) The application of polymer blends PM of the present invention is apparently of special interest in the paint sector. Preferably, in this case the copolymerisate P2 contains comonomers M, in particular in the form of functional monomers, e.g. (meth)acrylic acid, dimethylaminoethyl (meth)acrylate, dimethylaminopropyl (meth)acrylate, hydroxyethyl (meth)acrylate, among others. Special reference is made to copolymerisates P2, wherein R is methyl and $R_3$ is n-butyl.

(h) Polymer blends PM, which in addition to the polymers P1 and P2 contain still a third polymer specie P3, wherein P3 is not compatible either with P1 or P2, are quite interesting.

Having now generally described this invention, a further understanding can be obtained by reference to certain specific examples which are provided herein for purposes of illustration only and are not intended to be limiting unless otherwise specified.

The reduced viscosity n spec/c is determined according to DIN 51 562 (with $CHCl_3$ as solvent). As a polymer component, polystyrene of the following specification is suitable: n spec/c=79 ml/g.

(a) Production of P2 copolymers

Cyclohexyl methacrylate and monomers of formula II, III and, if desired, M are mixed in the desired proportions in a vessel with stirrer. (Cf. Tables). Under stirring, 0.2% by weight of lauroyl peroxide, with respect to the monomers, 0.1% by weight of tert.-butyl-per-2-ethyl-hexanoate and approximately 0.3% by weight of dodecylmercaptan are added. The mixture obtained in this manner is placed into a plastic bag (R) HOSTAPHAN of Hoechst AG and polymerized in the closed bag under the following conditions:

44–65 hours at 50° C. in a water bath, then tempered for 17 hours at 90° C.

(b) Production of PM polymer blends

The copolymerisate P2 is dissolved in toluene to 20% by weight and mixed with a solution of polystyrene (also 20% by weight in toluene). Films are cast from the mixtures. Then these films are dried for 24 hours at room temperature and subsequently for 24 hours at 50° C. in vacuum. The formation of transparent films indicates compatibility. The results from (a) and (b) are shown in the following tables.

EXAMPLE 1

Polymer blends PM1 are prepared as described at ($\alpha$) and ($\beta$) above in which polystyrene and a copolymerisate P2 from methyl methacrylate, n-decylmethacrylate and cyclohexyl methacrylate in a 60 : 20 : 20 weight ratio (n spec/c=49 ml/g) are employed. Table 1 shows the separation properties.

EXAMPLE 2

A polymer blend PM2 is produced according to ($\alpha$) and ($\beta$) from polystyrene and a copolymerisate from methyl methacrylate, n-butylmethacrylate and cyclohexyl methacrylate in a 40 : 40 : 20 weight ratio (n spec/c=44 ml/g). Table 2 shows the separation properties.

EXAMPLE 3

A polymer blend PM3 composed of polystyrene ($\eta$ spec/c=19 ml/g) and a copolymerisate compound of methyl methacrylate and cyclohexyl methacrylate in a 80:20 weight ratio ($\eta$spec/c=18 ml/g) is prepared.

Table 3 shows the separation properties.

TABLE 1

Turbidity points of polymer blends PM according to Example 1.

| Composition of the polymer blend PM | | Turbidity point °C. |
|---|---|---|
| polystyrene (% - wt.) | copolymerisate P2 (% - wt.) | |
| 98 | 2 | 206 |
| 95 | 5 | 185 |
| 90 | 10 | 167 |
| 80 | 20 | 149 |
| 60 | 40 | 146 |
| 50 | 50 | 154 |
| 40 | 60 | 155 |
| 20 | 80 | 188 |
| 10 | 90 | 205 |

TABLE 1-continued

Turbidity points of polymer blends PM according to Example 1.

| Composition of the polymer blend PM | | Turbidity point °C. |
|---|---|---|
| polystyrene (% - wt.) | copolymerisate P2 (% - wt.) | |
| 5 | 95 | decomposition |
| 2 | 98 | decomposition |

TABLE 2

Turbidity point of polymer blends PM according to Example 2.

| Composition of the polymer blend PM2 | | Turbidity point °C. |
|---|---|---|
| polystyrene (% - wt.) | copolymerisate P2 (% - wt.) | |
| 98 | 2 | 210 |
| 95 | 5 | 196 |
| 90 | 10 | 177 |
| 80 | 20 | 166 |
| 70 | 30 | 162 |
| 60 | 40 | 153 |
| 50 | 50 | 150 |
| 40 | 60 | 152 |
| 30 | 70 | 161 |
| 20 | 80 | 165 |
| 10 | 90 | 174 |
| 5 | 95 | 191 |
| 2 | 98 | 202 |

TABLE 3

Turbidity point of the reference blend according to Example 3.

| Composition of the polymer blend PM3 | | Turbidity point °C. |
|---|---|---|
| polystyrene (% - wt.) | copolymerisate P2 (% - wt.) | |
| 95 | 5 | 113 |
| 75 | 25 | 89 |
| 50 | 50 | 105 |
| 25 | 75 | 117 |
| 5 | 95 | 151 |

Results:

From the above it is obvious that despite a distinctly lower molecular weight (J=18 ml/g, or 19 ml/g as compared to J=79 ml/g, or 44 and 49 ml/g), the blend of polystyrene and binary copolymers is significantly less compatible than the corresponding blends with the terpolymers P2 according to the invention.

Having now fully described the invention, it will be apparent to one of ordinary skill in the art that many changes and modifications can be made thereto without departing from the spirit or scope of the invention as set forth herein.

WHAT IS CLAIMED AS NEW AND IS INTENDED TO BE SECURED BY LETTERS PATENT OF THE UNITED STATES IS:

1. A compatible polymer blend consisting of:
   (I) 0.1–99.9% by weight of a polymerisate P1, which is formed from monomers of formula I:

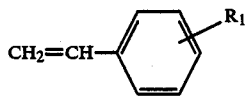

I wherein $R_l$ is hydrogen or methyl, and (II) 99.9–0.1% by weight of copolymerisate P2, which is formed from
(a) 5–40% by weight of cyclohexyl methacrylate
(b) 30–70% by weight of a methacrylic ester of formula II:

$$CH_2=\overset{CH_3}{\underset{}{C}}-\overset{O}{\underset{}{C}}-OR_2 \quad \text{II}$$

wherein $R_2$ is methyl or ethyl,
(c) 10–50% by weight of a methacrylic ester of formula III:

$$CH_2=\overset{CH_3}{\underset{}{C}}-\overset{O}{\underset{}{C}}-OR_3 \quad \text{III}$$

wherein $R_3$ is a hydrocarbon group having 4–18 carbon atoms, and
(d) 0–10 parts by weight of a monomer M which is copolymerizable with monomers of (a)–(c), yet different from these monomers.

2. The compatible polymer blends according to claim 1, wherein the blend exhibits a lower critical solution temperature (LCST).

3. The compatible polymer blend according to claim 1, wherein the monomer of formula II is methyl methacrylate.

4. The compatible polymer blend according to claim 2, wherein the monomer of formula II is methyl methacrylate.

5. The compatible polymer blend according to claim 1, wherein component (c) is n-butyl methacrylate, hexyl methacrylate, octyl methacrylate, n-decylmethacrylate, laurylmethacrylate, tetradecyl methacrylate, hexadecyl methacrylate or octadecyl methacrylate.

6. The compatible polymer blend according to claim 1, wherein comonomer M has the formula:

$$CH_2=\overset{R}{\underset{}{C}}-Q$$

wherein R is hydrogen or methyl and Q is $-COOR_4$, wherein $R_4$ is hydrogen, an alkali metal cation, ammonium ion, a hydroxy group containing ammonium ion, or a $-NR_5R_6$ group, wherein $R_5$ and $R_6$ each independently is a $C_{1-6}$ alkyl or the alkyl groups, together with the nitrogen atom, form a 5 or 6-membered heterocyclic ring or Q $$\text{is} -O-\overset{O}{\underset{}{C}}-R_7,$$

wherein $R_7$ is $C_{1-3}$ alkyl or Q is phenyl.

7. The compatible polymer blend according to claim 1, wherein comonomer M has the formula:

$$CH_2=CHCOOR_4$$

wherein $R_4$ is $C_{1-8}$ alkyl.

8. The compatible polymer blend according to claim 1, which comprises 5–95% by wt. component (I) and 95–5% by wt. component (II).

9. The compatible polymer blend according to claim 8, which comprises 20–80% by wt. component (I) and 80–20% by wt. component (II).

10. The compatible polymer blend according to claim 1, wherein in component (II), (a) is 10 to 30% by wt., (b) is 30 to 60% by wt. and (c) is 10 to 40% by wt.

11. The compatible polymer blend according to claim 1 which comprises a third polymer P3, which is neither compatible with polymerisate P1 nor with polymerisate P2.

* * * * *